United States Patent [19]

Brandstetter

[11] 4,289,386

[45] Sep. 15, 1981

[54] EYEGLASSES OF THE VARIABLE-LENS TYPE, AND POSITIONING MEMBER PARTICULARLY USEFUL THEREWITH

[76] Inventor: Aharon Brandstetter, 12 Oppenheimer St., Tel Aviv, Israel

[21] Appl. No.: 87,513

[22] Filed: Oct. 23, 1979

[30] Foreign Application Priority Data

Nov. 30, 1978 [IL] Israel .................................... 56092

[51] Int. Cl.³ ............................................... G02C 5/04
[52] U.S. Cl. ................................................ 351/128
[58] Field of Search ............... 351/128, 130, 131, 137, 351/161, 168, 55-59, 64, 69, 76, 107, 112, 124, 132, 88; 2/426

[56] References Cited

U.S. PATENT DOCUMENTS 2,020,629 11/1935 Yoe ..................................... 351/128
3,345,121 10/1967 De Angelis ......................... 351/128

Primary Examiner—John K. Corbin
Assistant Examiner—B. Wm. de los Reyes
Attorney, Agent, or Firm—Benjamin J. Barish

[57] ABSTRACT

A pair of eyeglasses of the variable-lens type is described including a positioning member adjustable on the eyeglass frame and engageable with the base of the wearer's nose to stably support the eyeglass frame in either a normal position, or in an elevated position with respect to the wearer's eyes.

In one described embodiment, the positioning member includes a saddle shaped element pivotably mounted to the eyeglass frame underlying the frame bridge; and in a second described embodiment, the positioning member includes a clip slidable receivable on the bridge of the eyeglass frame.

4 Claims, 5 Drawing Figures

EYEGLASSES OF THE VARIABLE-LENS TYPE, AND POSITIONING MEMBER PARTICULARLY USEFUL THEREWITH

BACKGROUND OF THE INVENTION

The present invention relates to eyeglasses of the variable-lens type, and also to a positioning member particularly useful in such eyeglasses.

The invention is particularly useful with respect to bi-focal eyeglasses in which one part of the lenses has a higher power than the remainder. Usually, the two partial lenses are mounted in the frame with the stronger lens below the weaker one, so that the wearer normally sees through the weaker one, and lowers his eyes in order to see through the stronger one. Alternatively, the lower partial lens may be the weaker one in bi-focals for short-sighted (myopic) persons. Such an arrangement for looking through the lower partial lens is not entirely satisfactory for several reasons: First, it may be optically inefficient since the viewer may have to look through the bottom lens portion along the line oblique to the optial axis of that lens portion, rather than along the optical axis; secondly, it may be inconvenient to the wearer since he must frequently raise his head to an awkward position in order to look through the lower lens portion.

BRIEF SUMMARY OF THE INVENTION

An object of the present invention is to provide a pair of eyeglasses of the variable-lens type having advantages in the above respects. Another object of the invention is to provide a positioning member for use in the variable-lens particularly multi-focal lens, type of eyeglasses.

According to the invention, a pair of eyeglasses of the variable-lens type, including an eyeglass frame mounting the lenses, is provided with a positioning member engageable with the wearer's nose for aligning the lenses of the eyeglass frame with the wearer's eyes.

In one described embodiment, the eyeglass frame includes a pair of arms pivotably supporting the positioning member, which arms are in turn pivotably mounted at their ends to the eyeglass frame to assume either a first position wherein the positioning member is above the pivotable mounting of the arm ends, or a second position wherein the positioning member is below the pivotable mounting of the arm ends. The positioning member thus stably supports the eyeglass frame in either a normal position, or in an elevated position, with respect to the wearer's eyes. In this described embodiment, the positioning member includes a saddle-shaped nose element restable on the base of the wearer's nose, the pair of arms being of a single U-shaped configuration having a central leg passing through a bore in the saddle-shaped element, and two bent-over outer legs pivotably mounted at their outer tips to the eyeglass frame. Preferably, the latter outer tips are merely journalled in openings formed in the inner faces of the rims of the eyeglass frame.

In a second described embodiment, the positioning member is slidably mounted to the eyeglass frame to stably support same in two or more positions. In this described embodiment the positioning member includes a clip receivable over the bridge of the eyeglass frame, a holder carried by the clip, and a slide slidable in the holder, the lower end of the slide being configured to comfortably rest on the base of the wearer's nose.

The invention may be embodied in a pair of eyeglasses constructed with the positioning member incorporated therein. Alternatively, the invention may be embodied as an attachment sold separately and attachable by the user himself to his pair of eyeglasses.

Further features and advantages of the invention will be apparent from the description below.

BRIEF DESCRIPTION OF THE DRAWINGS

The invention is herein described, by way of example only with reference to the accompanying drawings, wherein.

DESCRIPTION OF THE PREFERRED EMBODIMENTS

Figure 1:
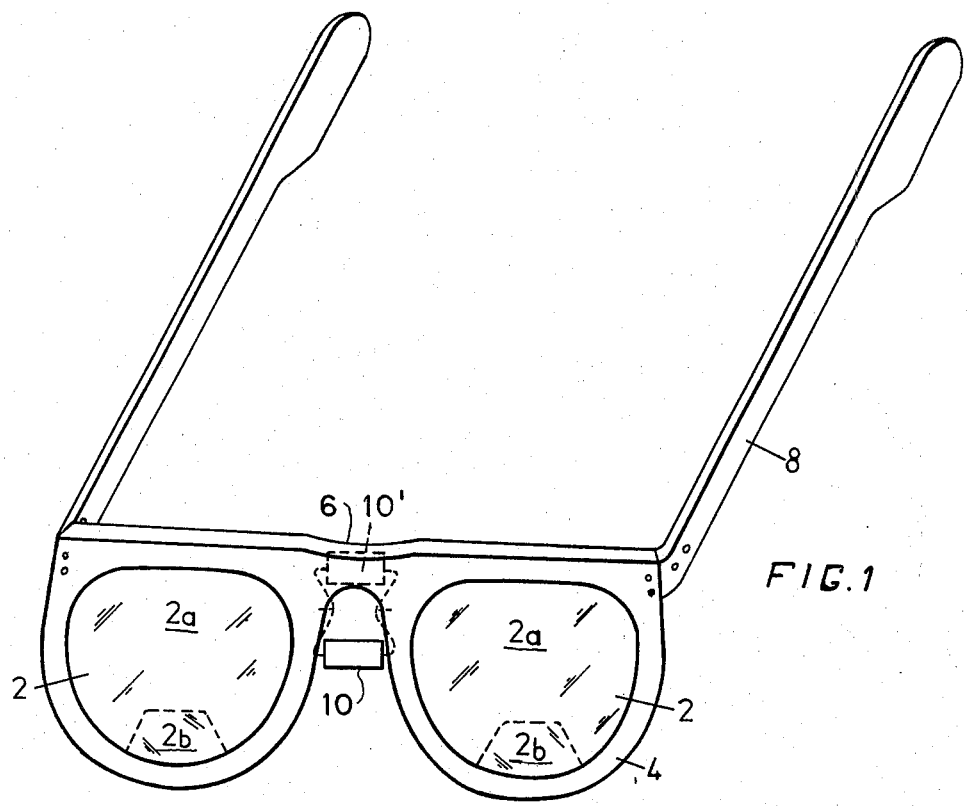
FIG. 1 illustrates a pair of eyeglasses of the multi-focal, e.g. bi-focal, lens type having frames constructed in accordance with one embodiment of the invention.

With reference first to FIG. 1, there is shown a pair of eyeglasses of the bi-focal type, i.e., one in which the lenses 2 are constituted of two portions, namely an upper partial-lens 2a and a lower partial lens 2b of a different strength. Usually the lower partial lens 2b is designed for near-viewing.

The two lenses 2 are mounted within rims 4 of a frame including a bridge 6 and a pair of bows 8, as in the conventional eyeglass frame construction.

In accordance with the present invention, a positioning member, generally designated 10, is adjustably attached to the eyeglass frame so as to be engageable with the base of the wearer's nose to stably support the eyeglass frame in either a normal position or in an elevated position with respect to the wearer's eyes. In the normal position of the eyeglass frame the upper partial-lens 2a would be substantially aligned with the pupils of the wearer's eyes; and in the elevated position, the lower partial-lens 2b would be substantially aligned with the wearer's pupils.

Figure 2:
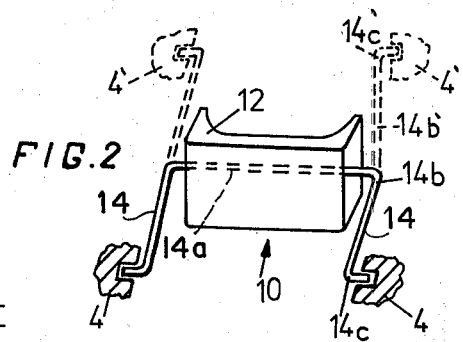
FIG. 2 is an enlarged fragmentary view illustrating the positioning member included in the eyeglass frame of FIG. 1, FIG. 2 particularly illustrating the two stable positions of the eyeglass frame by the use of the positioning member.

The positioning member 10 is more particularly illustrated in FIG. 2, wherein it will be seen that it includes a saddle-shaped nose element 12 and a pair of opposed arms 14 pivotably mounted to the nose element 12 and also to the inner faces of the rims 4 of the eyeglass frame under, and in alignment with, the bridge 6. The saddle-shaped nose element 12 is configured so as to confortably rest on the base of the wearer's nose. It is preferably made of plastic material. The opposed arms 14 are preferably constituted of a single U-shaped piece of metal wire or plastic wire having a central portion or leg 14a passing through a bore in the saddle-shaped nose element 12, and two bent over outer portions or legs 14b the outer tips 14c of the latter being journalled within openings in the inner faces of the lens rims 4.

As can be seen particularly in FIGS. 1 and 2, the pivotable mounting of the outer tip 14c of the U-shaped member 14 permits the eye-glass frame 4 to assume either a first position wherein the saddle-shaped nose element 12 is above the pivotably-mounted ends 14c, as shown in the full-line position of the U-shaped member 14 in FIG. 2, or to a second position wherein the nose element 12 is below the pivotably-mounted ends, as shown in the broken-line positions 4', 14b' and 14c' of the rim 4, arms 14b and ends 14c, respectively.

The eyeglass frames are worn in the usual manner, except that the saddle-shaped element 12 of the positioning member 10 rests on the base of the wearer's nose. When the wearer wishes to look through the lenses 2 in the normal way, i.e. through the upper partial-lenses 2a, he would manually move the eyeglass frame, while the saddle-shaped element 12 remains in engagement with the base of the wearer's nose, to pivot the arms 14 on the saddle-shaped element 12 to their lower positions as shown in full lines in FIGS. 2 and 3. In this position the upper partial-lenses 2a are aligned with the wearer's pupils.

Figure 3:
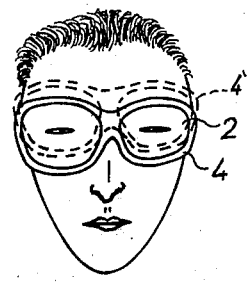
FIG. 3 illustrates a person wearing the eyeglasses of FIGS. 1 and 2 showing the two stable positions thereof as a result of providing the positioning member illustrated in FIG. 2.

Now, whenever the occasion arises for the wearer to look through the lower partial-lenses 2b, he lifts the eyeglass frames with one hand while the saddle-shaped element remains seated on the base of the wearer's nose, so as to pivot the arms 14 to their upper broken-line positions 14 illustrated in FIG. 2. This pivoting of the arms 14 lifts the eyeglass frames to the elevated position wherein the lower partial-lens 2b are now aligned with the wearer's pupils. This elevated position of the eyeglass frames, which is stably maintained by the positioning member 10, is indicated in FIGS. 2 and 3 by the broken line positions 14b', 14c' and 4' of the arms 14 and rims 4, respectively. The wearer may thus look through the lower partial-lenses 2b along the optical axes of the partial-lenses, rather than obliquely to these axes. This may not only be optically more efficient, but is also more convenient to the wearer since he may thus be spared the awkwardness at times of having to raise his head in order to look through the lower partial-lenses.

Figure 4:
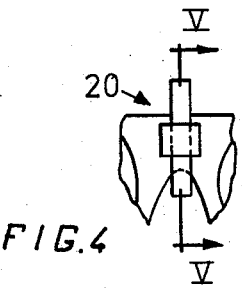
FIGS. 4 and 5 are front and side elevational views, respectively, showing a second form of positioning member that may be used in accordance with the invention.
Figure 5:
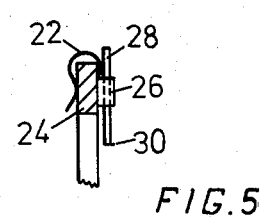

FIGS. 4 and 5 illustrate another embodiment of the invention wherein the positioning member, generally designated 20, is in the form of an attachment attachable to the bridge of the eyeglass frame, and is slidably mounted to position the eyeglass frames in two (or more) stable positions.

Thus, the positioning member 20 in FIGS. 4 and 5 includes a clip 22 receivable over the bridge 24 of the eyeglass frame, clip 22 carrying a holder 26 which receives a slide 28. The latter slide terminates at its lower end in a shaped element 30 which may also be of saddle-shape as element 12 in FIGS. 1–3, element 30 being shaped to rest comfortably on the base of the wearer's nose.

It will be appreciated that when slide 28 is in its upper position, the eyeglass frames will be stably supported in their normal positions with the upper partial-lenses (2a in FIG. 1) aligned with the wearer's pupils; and when it is desired to elevate the eyeglass frame, slide 28 may be manually pushed downwardly so that the eyeglass frames will be stably supported in their elevated position with the lower partial-lenses 2b aligned with the wearer's pupils.

The positioning member 20 in FIGS. 4 and 5 may be provided with conventional ball-and-detent means between slide 28 and holder 26 to releasably retain the slide in its two stable positions. It will be appreciated that the slide could be arranged to stably support the eyeglass frame in more than two stable positions, e.g. when the device is used with tri-focal or other multi-focal lenses.

While the invention has been described with respect to the multi-focal lens type, it will be appreciated that it could be used with other variable-lens types, such as with a variable-tint lenses.

Many other variations, modifications, and applications of the invention will be apparent.

What is claimed is:

1. A pair of eyeglasses of the variable-lens type including an eyeglass frame mounting the lenses, and a positioning member engageable with the wearer's nose for aligning the lenses of the eyeglass frame with the wearer's eyes, characterized in that the eyeglass frame includes a pair of arms pivotably supporting said positioning member, which arms are in turn pivotably mounted at their ends to the eyeglass frame to assume either a first position wherein the positioning member is above the pivotable mounting of the arm ends, or a second position wherein the positioning member is below the pivotable mounting of the arm ends, to thereby stably support the eyeglass frame in either a normal position with respect to the wearer's eyes, or in an elevated position with respect to the wearer's eyes.

2. A pair of eyeglasses according to claim 1, wherein said positioning member includes a saddle-shaped nose element restable on the base of the wearer's nose, said pair of arms being of a single U-shaped wire having a central leg passing through a bore in the saddle-shaped element, and two bent-over outer legs mounted at their outer tips to the eyeglass frame.

3. A pair of eyeglasses according to claim 2, wherein the outer tips of said outer legs are journalled in openings formed in the inner faces of the rims of the eyeglass frame.

4. A pair of eyeglasses of the variable-lens type, including an eyeglass frame having a bridge, a pair of lenses, and a positioning member engageable with the wearer's nose for aligning the lenses of the eyeglass frame with the wearer's eyes, said positioning member being slidably mounted to the eyeglass frame to stably support same in at least two positions, said positioning member including a clip receivable over the bridge of the eyeglass frame, a holder carried by the clip, and a slide slidable in the holder, the lower end of the slide being configured to comfortably rest on the base of the wearer's nose.

* * * * *